(12) United States Patent
Kai et al.

(10) Patent No.: US 10,549,264 B2
(45) Date of Patent: Feb. 4, 2020

(54) METHOD OF REGENERATING USED DENITRATION CATALYST

(71) Applicant: MITSUBISHI HITACHI POWER SYSTEMS, LTD., Yokohama-shi, Kanagawa (JP)

(72) Inventors: Keiichiro Kai, Yokohama (JP); Yasuyoshi Kato, Yokohama (JP); Naomi Imada, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/566,047

(22) PCT Filed: Apr. 13, 2016

(86) PCT No.: PCT/JP2016/061893
§ 371 (c)(1),
(2) Date: Oct. 12, 2017

(87) PCT Pub. No.: WO2016/167280
PCT Pub. Date: Oct. 20, 2016

(65) Prior Publication Data
US 2018/0133691 A1 May 17, 2018

(30) Foreign Application Priority Data
Apr. 17, 2015 (JP) .................................. 2015-085472

(51) Int. Cl.
| B01J 21/20 | (2006.01) |
| B01J 23/92 | (2006.01) |
| B01D 53/86 | (2006.01) |
| B01D 53/96 | (2006.01) |
| B01J 21/04 | (2006.01) |
| B01J 23/34 | (2006.01) |
| B01J 35/00 | (2006.01) |
| B01J 38/48 | (2006.01) |
| B01J 21/06 | (2006.01) |
| B01J 38/64 | (2006.01) |

(52) U.S. Cl.
CPC .......... *B01J 21/20* (2013.01); *B01D 53/8621* (2013.01); *B01D 53/96* (2013.01); *B01J 21/04* (2013.01); *B01J 23/34* (2013.01); *B01J 23/92* (2013.01); *B01J 35/0006* (2013.01); *B01J 38/485* (2013.01); *B01D 2255/20707* (2013.01); *B01J 21/063* (2013.01); *B01J 38/64* (2013.01)

(58) Field of Classification Search
CPC ... B01J 21/20; B01J 23/92; B01J 38/48; B01J 38/60; B01J 38/62; Y10S 502/514; Y10S 502/515; Y10T 436/22
See application file for complete search history.

(56) References Cited

U.S. PATENT DOCUMENTS

| 4,952,381 A | 8/1990 | Rikimaru et al. |
| 8,323,597 B2 * | 12/2012 | Kato .................. B01D 53/8665 423/210 |
| 2009/0005235 A1 * | 1/2009 | Lee .......................... B01J 21/20 502/25 |
| 2013/0287665 A1 * | 10/2013 | Yonemura ................ B01J 23/30 423/239.1 |

FOREIGN PATENT DOCUMENTS

| CN | 103894240 A | 7/2014 |
| JP | 53-26269 A | 3/1978 |
| JP | 55-145532 A | 11/1980 |
| JP | 59-49847 A | 3/1984 |
| JP | 63-72343 A | 4/1988 |
| JP | 4-110038 A | 4/1992 |
| JP | 2000-24520 A | 1/2000 |
| JP | 2004-267897 A | 9/2004 |
| JP | 2005-313161 A | 11/2005 |
| JP | 2012-245480 A | 12/2012 |

OTHER PUBLICATIONS

MSDS "Manganese Dioxide" IPCS INCHEM, Oct. 2001 (Year: 2001).*
International Search Report dated Jul. 5, 2016, issued in counterpart application No. PCT/JP2016/061893. (2 pages).
Maliyekkal, S. M. et al., "As(III) removal from drinking water using manganese oxide-coated-alumina: Performance evaluation and mechanistic details of surface binding", Chemical Engineering Journal, Nov. 1, 2009, vol. 153, No. 1-3, pp. 101-107, XP206378559; cited in Extended (supplementary) European Search Report dated Dec. 6, 2018.
Office Action dated Aug. 5, 2019, issued in counterpart CN application No. 201680021909.2, with English translation. (8 pages).
Wang, et al., "Interactions of different manganese oxides with arsenic", ACTA Scientiae Circumstantiae, Oct. 2014, vol. 34, No. 10, pp. 2608-2614, with English abstract, cited in CN Office Action dated Aug. 8, 2019. (8 pages).

* cited by examiner
(Continued)

*Primary Examiner* — Amber R Orlando
*Assistant Examiner* — Syed T Iqbal
(74) *Attorney, Agent, or Firm* — Westerman, Hattori, Daniels & Adrian, LLP

(57) ABSTRACT

A used denitration catalyst is regenerated by means of a method comprising bringing the used denitration catalyst comprising titanium oxide as an essential ingredient into contact with a suspension of particles comprising manganese oxide, subjecting the resulting product to a liquid draining, and subjecting the liquid-drained product to a drying process, additionally, further comprising impregnating a solution comprising a compound containing at least one element selected from the group consisting of vanadium, molybdenum and tungsten into the denitration catalyst after the drying process, and subjecting the impregnated product to a drying treatment.

6 Claims, No Drawings

US 10,549,264 B2

METHOD OF REGENERATING USED DENITRATION CATALYST

TECHNICAL FIELD

The present invention relates to a method for regenerating a used denitration catalyst. More specifically, the present indention relates to a method for regenerating a used denitration catalyst comprising titanium oxide as an essential ingredient to obtain a regenerated denitration catalyst having higher denitration performance, with a small number of operations and inexpensively, while maintaining the shape thereof.

BACKGROUND ART

A catalyst comprising titanium oxide as an essential ingredient exhibits high activity and high durability in a denitration process using ammonia or urea, and therefore has been widely used domestically and internationally. In this denitration catalyst, denitration performance is reduced, during use for a long period of time, due to adhesion of a catalyst poison such as an alkaline component, arsenic, phosphorus or the like that is contained in an exhaust gas, coarsening of catalyst particles by sintering, or the like. When the denitration performance is reduced, the catalyst is replaced with a new denitration catalyst. Upon this replacement, a large amount of used denitration catalyst is produced. The used denitration catalyst is regenerated to reduce a waste material, catalyst production cost and the like.

As a method for regenerating a used denitration catalyst, for example, Patent Literature 1 discloses a method comprising dissolving a used titania solid catalyst in a mineral acid, heating the obtained solution to cause hydrolysis thereof, and subsequently neutralizing the resulting product by alkali.

Patent Literature 2 discloses a method comprising preparing a slurry composed of water, sulfuric acid and/or salts of sulfuric acid, and a catalyst component powder comprising any of titanium oxide and vanadium oxide; titanium oxide, vanadium oxide and molybdenum oxide; titanium oxide, vanadium oxide and tungsten oxide; or titanium oxide, vanadium oxide, molybdenum oxide and tungsten oxide, and coating the slurry, by a spray method or an immersion method, on a surface of a low active denitration catalyst to which an alkaline metal element or an alkaline earth metal element adheres, Patent Literature 3 discloses a method comprising making oxalic acid supported on a used denitration catalyst composed of a metallic substrate comprising iron such as a metal lath or the like and a denitration catalyst component, treating the resulting product with a solution comprising an ammonium salt of tungstic acid, and subjecting the treated product to a drying process.

Patent Literature 4 discloses a method comprising impregnating water into a used denitration catalyst comprising titanium oxide, vanadium oxide, tungsten oxide or molybdenum oxide, and aluminum sulfate as an essential ingredient, heat-treating the impregnated catalyst at not less than 50° C. and not more than 100° C. to hydrolyze the aluminum sulfate in the catalyst, and then washing the resulting catalyst with water.

CITATION LIST

Patent Literatures

Patent Literature 1: JP S55-145532 A
Patent Literature 2: JP 2000-024520 A
Patent Literature 3: JP 2004-267897 A
Patent Literature 4: JP 2012-245480 A

SUMMARY OF THE INVENTION

Problems to be Solved by the Invention

In the method for removing a catalyst poison by washing, there generally are the following problems. (1) A large amount of water or a chemical is required: for washing. Further, a significant cost is required for disposal of a washing waste liquid. (2) If arsenic or phosphorus is adsorbed on titanium oxide in a state of oxoacid, it is unable to be sufficiently removed by washing with water or a chemical, and therefore a degree of recovery of denitration performance is lower.

An object of the present invention is to provide a method for regenerating used denitration catalyst comprising titanium oxide as an essential ingredient into a regenerated denitration catalyst having higher denitration performance, with a small number of operations and inexpensively, while maintaining the shape thereof.

Means for Solving the Problems

Researches for achieving the object have resulted in the completion of the present invention including the following embodiments.

[1] A method for regenerating used denitration catalyst, comprising:
bringing a used denitration catalyst comprising titanium oxide as an essential ingredient into contact with a suspension of particles comprising manganese oxide,
subjecting the resulting product to a liquid draining, and subjecting the liquid-drained product to a drying process.

[2] The method for regenerating used denitration catalyst according to [1], wherein the particles comprising manganese oxide are manganese oxide-supported on titanium oxide particles or manganese oxide-supported on aluminum oxide particles.

[3] The method for regenerating used denitration catalyst according to [1] or [2], wherein the manganese oxide is MnO or $Mn_3O_4$.

[4] The method for regenerating used denitration catalyst according to any one of [1] to [3], further comprising:
impregnating a solution comprising a compound containing at least one element selected from the group consisting of vanadium, molybdenum and tungsten into the denitration catalyst after the drying process, and subjecting the impregnated product to a drying treatment.

Advantageous Effects of the Invention

According to the regeneration method of the present invention, a used denitration catalyst comprising titanium oxide as an essential ingredient can be reactivated to obtain a regenerated denitration catalyst having higher denitration performance with a small number of operations and inexpensively, while substantially maintaining the shape thereof.

According to the regeneration method of the present invention, even if arsenic or phosphorus is strongly adsorbed on titanium oxide in a state of oxoacid, the used denitration catalyst can be regenerated into a regenerated denitration catalyst having higher denitration performance with a small number of operations and inexpensively.

An arsenic compound that has been able to be removed only by using a large amount of washing water or applying severe conditions according to a conventional method can be easily removed according to the present invention. Thus, the range in which the used denitration catalyst can be regenerated is significantly extended, which can be significantly contributed to efficient use and recycle of resources.

A principle of the regeneration in the present invention is presumed as described below.

Titanium oxide and arsenate ion are considered to be significantly shifted to a product side (right side of a formula (1)) in a chemical equilibrium represented by the formula (1). An amount of arsenate ion eluted into a liquid phase is small, and therefore an amount of arsenic to be removed by one time washing is small.

Manganese oxide and arsenate ion cause the reaction represented by a formula (2) or the like. In this reaction, the arsenate ion reacts with the manganese oxide, and is precipitated, and therefore a concentration of the arsenate ion in the liquid phase is reduced. As a result, a leftward reaction is promoted in the formula (1). Thus, the arsenic adsorbed on titanium oxide can be efficiently removed.

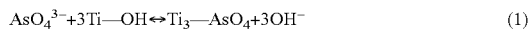
$$AsO_4^{3-} + 3Ti\text{—}OH \leftrightarrow Ti_3\text{—}AsO_4 + 3OH^- \quad (1)$$

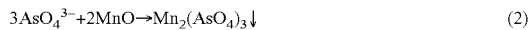
$$3AsO_4^{3-} + 2MnO \rightarrow Mn_2(AsO_4)_3 \downarrow \quad (2)$$

EMBODIMENTS FOR CARRYING OUT THE INVENTION

A method for regenerating used denitration catalyst according to the present invention comprises bringing a used denitration catalyst comprising titanium oxide as an essential ingredient into contact with a suspension of particles comprising manganese oxide; subjecting the resulting product to a liquid draining; and subsequently subjecting the liquid-drained product to a drying process.

The used denitration catalyst to be used in the present invention comprises titanium oxide as an essential ingredient. Specific examples thereof can include a honeycomb shaped catalyst comprising a catalytic active substance comprising titanium oxide, being an essential ingredient and an oxide comprising an element such as W, Mo, V or the like being an accessory ingredient; a catalyst comprising a plate-shaped substrate such as a metal lath, a plate made of glass fibers or the like, and a catalytic active substance supported on the plate-shaped substrate, the catalytic active substance comprising titanium oxide being an essential ingredient and an oxide comprising an element such as W, Mo, V or the like being an accessory ingredient; and the others.

The used denitration catalyst to be used in the present invention is preferably washed with water to reduce an amount of a sulfate $SO_4$ component or a chloride Cl component. The sulfate component or the chloride component reacts with manganese oxide to form a soluble manganese salt. If such a manganese salt migrates into the denitration catalyst, a $SO_2$ oxidizing ability of the catalyst may be increased. Therefore, in the present invention, using of the used denitration catalyst in which the amount of the sulfate component or the chloride component is reduced by washing with water can improve a recovery percentage of the denitration performance without increasing an ability to oxidize $SO_2$.

The manganese oxide to be used in the present invention may be in any form such as manganese(II) oxide: MnO, manganese(II, III) oxide: $Mn_3O_4$, manganese(III) oxide: $Mn_2O_3$, manganese(IV) oxide: $MnO_2$ and the like. In the present invention, from a viewpoint of easily forming manganese arsenate: $Mn_2(AsO_4)_3$ manganese (III) oxide: MnO or manganese (II, III) oxide: $Mn_3O_4$ is preferable.

In the present invention, commercially available manganese oxide can be employed. However, in a commercial item, a surface of manganese oxide may be inactivated, and therefore it is preferable to activate the surface thereof by applying surface treatment thereto before use.

Moreover, in the present invention, manganese (II) oxide: MnO obtained by calcining a divalent manganese salt such as manganese oxalate and the like at a temperature of about 300 to 500° C. under a reducing atmosphere as in a nitrogen gas flow can be employed. The manganese(II) oxide: MnO obtained by this method is preferred, since it has the surface on which the arsenate ion is easily adsorbed.

The particles comprising manganese oxide to be used in the present invention may be particles consisting of manganese oxide, but from a viewpoint of an increased contact area with the arsenate ion and the like to have a capability of decreasing an amount of manganese oxide to be used, are preferably particles comprising manganese oxide supported on carrier particles.

The carrier particles to be used in the present invention are not particularly limited, but are preferably titanium oxide particles or aluminum oxide particles. As the titanium, oxide particles, anatase-type titanium oxide particles are preferable. As the aluminum oxide particles, active alumina particles are preferable. The carrier particles to be used in the present, invention are not particularly limited by a specific surface area. The specific surface area of the carrier particles is preferably 80 to 200 $m^2/g$.

The manganese oxide can be supported on the carrier particles by a publicly-known technique. Specific examples thereof can include a method comprising impregnating a manganate solution into carrier particles composed of titanium oxide, aluminum oxide or the like, and subsequently being subjected to the drying process, and the like. In the above-described supporting method, a calcination process may be applied thereto in place of the drying process or after the drying process.

An amount of manganese oxide to be supported on the carrier particles is preferably 1 to 20% by mass.

The suspension to be used in the present invention is a suspension liquid that the particles comprising manganese oxide as a suspensoid are suspended in a suspending medium. As the suspending medium, water is preferably used. A size of the particles comprising manganese oxide in a suspended form is not particularly limited as long as the size of the particles is in the range in which the suspension state can be maintained. When the particles consisting of manganese oxide as the suspensoid are used, the amount of the manganese oxide contained in the suspension is preferably 1 to 30% by mass. When the particles comprising manganese oxide-supported on carrier particles are used as the suspensoid, the amount of the particles comprising the manganese oxide contained in the suspension is preferably 1 to 10% by mass.

From a viewpoint of adsorbing, on manganese oxide, the arsenate ion to be eluted into the liquid to facilitate conversion into arsenate, the suspension to be used in the present invention is preferably acidic. In the suspension, a pH adjusting substance may be contained in order to acidify the suspension. Specific examples of the pH adjusting substance can include an organic acid or a salt thereof, an inorganic acid or a salt thereof, and the like. As the organic acid, mentioned can be oxalic acid, citric acid and the like. As the inorganic acid, mentioned can be mineral acid such as nitric acid, sulfuric acid and the like. An amount of the pH adjusting substance contained in the suspension is preferably 0.1 to 5% by mass.

The manner for bringing the used denitration catalyst into contact with the suspension is not particularly limited. For example, the contact can be performed by immersing the used denitration catalyst into the suspension. When the contact is performed by the immersion, the suspension can be used in an amount of 3 to 20 parts by mass relative to 1 part by mass of the used denitration catalyst. A temperature of the suspension during the immersion is preferably from an ordinary temperature to 100° C. An state that the used denitration catalyst is immersed into the suspension is preferably kept for 20 to 200 hours while stirring the suspension. The suspension can be stirred by means of a stirrer, a pump and the like. Thus, the arsenic in the used denitration catalyst is converted into the arsenate ion and the like and eluted into the suspension, and adsorbed on the manganese oxide.

Next, after elapse of predetermined time, the denitration catalyst is pulled out from the suspension and a liquid is drained from the denitration catalyst. The resultant product may be washed with water before liquid draining when necessary. The particles comprising manganese oxide attached on the surface can be removed by washing with water, and then subjected to the drying process. The drying process is not particularly limited by the manner, and can be performed by means of natural drying, ordinary-temperature draft drying, high-temperature draft drying and the like, for example.

Next, a catalyst accessory ingredient such as V, Mo, W or the like can be supplemented to the denitration catalyst subjected to the above-described drying process. A manner of the supplementation is not particularly limited. For example, the accessory ingredient can be supplemented by a method comprising impregnating a solution comprising a compound containing at least one element selected from the group consisting of vanadium, molybdenum and tungsten into the denitration catalyst subjected to the drying process, and subsequently subjecting the impregnated product to a drying treatment.

Specific examples of the compound containing vanadium element can include vanadyl sulfate, ammonium metavanadate, vanadium oxide, and the like. As the compound containing molybdenum element, mentioned can be ammonium molybdate and the like. As the compound containing the tungsten element, mentioned can be ammonium tungstate and the like. Further, a phosphorus element or an aluminum element can be supplemented thereinto when necessary. A supplementation of Al or P can be performed by an impregnation method similar to that in the supplementation of V or the like. Specific examples of the compound containing phosphorus element can include phosphoric acid, polyphosphoric acid, and the like. As the compound containing aluminum element, mentioned can be anhydrous aluminum sulfate, aluminum sulfate hydrate and the like.

A concentration and an amount of the solution containing the above-described element can be appropriately set based on an amount of the supported catalyst ingredient required for the regenerated catalyst having competent performance.

Impregnation can be performed by putting the solution in a vessel, and immersing a catalyst to be regenerated thereinto; spraying the solution from a nozzle onto the surface of a catalyst to be regenerated, or the like. An impregnation time is not particularly limited as long as the time is enough for the solution to be penetrated into pores of the catalyst to be regenerated.

After the impregnation, a liquid can be drained from the resultant product, and then the liquid-drained product can be subjected to the drying treatment. The drying treatment is not particularly limited by the method, and can be performed by means of natural drying, ordinary-temperature draft drying, high-temperature draft drying and the like, fob example. Further, after the drying treatment, a calcination process can be applied thereto when necessary.

The present invention is more specifically described by illustrating Examples described below. However, a scope of the present invention is not limited by the Examples described below.

(Measurement of Denitration Efficiency)

In a tubular reactor set at 350° C., one sheet of denitration catalyst having a size of 20 mm×100 mm was put. A gas having a compositional proportion shown in Table 1 was fed at 3.1 L/min to the tubular reactor to determine denitration efficiency.

TABLE 1

| 1. Gas composition | |
| --- | --- |
| $NO_x$ | 200 ppm |
| $NH_3$ | 240 ppm |
| $SO_2$ | 500 ppm |
| $O_2$ | 3% |
| $CO_2$ | 12% |
| $H_2O$ | 17% |
| 2. Gas flow rate | 3.1 L/min |
| 3. Temperature | 350° C. |
| 4. Catalyst amount | 20 mm-width × 100 mm(total length) – one sheet |

(Content of Arsenic and Manganese)

A fluorescent X-ray analysis was conducted on a catalyst, and a content of As and Mn was calculated in terms of mass of $As_2O_3$ and MnO.

Reference Example

To a metal lath basal plate made of SUS 430, a catalyst paste comprising titanium oxide, ammonium tungstate and ammonium metavanadate was applied to be 94/5/1 in an atomic ratio of Ti/Mo/V, and the resultant product was dried to obtain a plate-shaped denitration catalyst. No arsenic was detected from the fresh plate-shaped denitration catalyst.

A denitration process of a coal exhaust gas had been conducted using the plate-shaped denitration catalyst for 20,000 hours. In the denitration catalyst used in the above process, 2.8% by mass of arsenic was detected in terms of $As_2O_3$. Denitration efficiency of the used denitration catalyst was 38%.

A small piece having a dimension of 100 mm×100 mm was cut from the used denitration catalyst, and employed as a catalyst specimen to be regenerated for testing.

Example 1

Manganese oxalate dihydrate (made by Kishida Chemical Co. Ltd.) was dried at 120° C. for 12 hours and subsequently was dried in a nitrogen gas flow at 500° C. for 2 hours to obtain a manganese(II) oxide: MnO powder. To 100 mL of water, 10 g of the MnO powder was added to obtain a suspension a.

One sheet of the catalyst to be regenerated was immersed into the suspension a. While the suspension was stirred, the immersed state was maintained at 60° C. for 120 hours. The catalyst to be regenerated was pulled out from the suspension, and washed with 100 mL of water for removing a suspensoid attached on the catalyst surface. Then, a liquid was sufficiently drained from the resultant product, and the liquid-drained product was dried at 150° C. for 1 hour, and subsequently dried at 350° C. for 24 hours to obtain a regenerated denitration catalyst 1a. In the regenerated denitration catalyst 1a, an arsenic content was 0.8% by mass in terms of $As_2O_3$, and a manganese content was less than 0.1% by mass in terms of MnO. Denitration efficiency of the regenerated denitration catalyst 1a was 55%.

Example 2

Manganese oxalate dihydrate (made by Kishida Chemical Co. Ltd.) was dried at 120° C. for 12 hours, and subsequently was dried in an air flow at 500° C. for 2 hours to obtain a manganese(II, III) oxide: $Mn_3O_4$ powder. To 100 mL of water, 10 g of the $Mn_3O_4$ powder was added to obtain a suspension b.

A regenerated denitration catalyst 2a was obtained in the same manner as in Example 1 except that the suspension b was used in place of the suspension a. In the regenerated denitration catalyst 2a, an arsenic content was 1.2% by mass in terms of $As_2O_3$, and a manganese content was less than 0.1% by mass in terms of MnO. Denitration efficiency of the regenerated denitration catalyst 2a was 53%.

Example 3

A manganese nitrate aqueous solution was added to an anatase-type titanium oxide powder having a specific surface area of 90 $m^2$/g, and the resultant product was evaporated to dryness. The dry-solidified product was calcined at 500° C. for 2 hours to obtain a 10% by mass of manganese oxide supported on titanium oxide powder. To 100 mL of water, 10 g of the manganese oxide supported on titanium oxide powder was added to obtain a suspension c.

A regenerated denitration catalyst 3a was obtained in the same manner as in Example 1 except that the suspension c was used in place of the suspension a. In the regenerated denitration catalyst 3a, an arsenic content was 0.9% by mass in terms of $As_2O_3$, and a manganese content was 0.2% by mass in terms of MnO. Denitration efficiency of the regenerated denitration catalyst 3a was 54%.

Example 4

A manganese nitrate aqueous solution was added to an aluminum oxide powder having a specific surface area of 200 $m^2$/g, and the resultant product was evaporated to dryness. The dry-solidified product was calcined at 500° C. for 2 hours to obtain a 10% by mass of manganese oxide supported on aluminum oxide powder. To 100 mL of water, 10 g of the manganese oxide supported on aluminum oxide powder was added to obtain a suspension d.

A regenerated denitration catalyst 4a was obtained in the same manner as in Example 1 except that the suspension d was used in place of the suspension a. In the regenerated denitration catalyst 4a, an arsenic content was 0.7% by mass in terms of $As_2O_3$, and a manganese content was 0.2% by mass in terms of MnO. Denitration efficiency of the regenerated denitration catalyst 4a was 56%.

Comparative Example 1

A regenerated denitration catalyst 1b was obtained in the same manner as in Example 1 except that 100 mL of pure water was used in place of the suspension a. The results are shown in Table 2.

Comparative Example 2

A regenerated denitration catalyst 2b was obtained in the same manner as in Example 1 except that 100 mL of a 1 N oxalic acid aqueous solution was used in place of the suspension a. The results are shown in Table 2.

Example 5

Into 180 mL of pure water, 5 g of ammonium metavanadate ($NH_4VO_3$) and 5 g of molybdenum trioxide ($MoO_3$) were dissolved to obtain a yellowish brown and transparent solution. The solution was an aqueous solution of a composite oxoacid salt represented by the rational formula: $(NH_4)_3Mo_2V_3O_{15}$.

The regenerated denitration catalyst 1a obtained in Example 1 was immersed into the aqueous solution for 30 seconds to impregnate the aqueous solution into the regenerated denitration catalyst 1a. The denitration catalyst was pulled out from the aqueous solution, a liquid sufficiently was drained from the resultant product, and subsequently the liquid-drained product was dried at 120° C. for 1 hour, and then dried at 350° C. for 24 hours to obtain a regenerated denitration catalyst 5a. The results are shown in Table 2.

Example 6

A regenerated denitration catalyst 6a was obtained in the same manner as in Example 5 except that the regenerated denitration catalyst 2a was used in place of the regenerated denitration catalyst 1a. The results are shown in Table 2.

Example 7

A regenerated denitration catalyst 7a was obtained in the same manner as in Example 5 except that the regenerated denitration catalyst 3a was used in place of the regenerated denitration catalyst 1a. The results are shown in Table 2.

Example 8

A regenerated denitration catalyst 8a was obtained in the same manner as in Example 5 except that the regenerated denitration catalyst 4a was used in place of the regenerated denitration catalyst 1a. The results are shown in Table 2.

Comparative Example 3

A regenerated denitration catalyst 3b was obtained in the same manner as in Example 5 except that the regenerated denitration catalyst 1b was used in place of the regenerated denitration catalyst 1a. The results are shown in Table 2.

Comparative Example 4

A regenerated denitration catalyst 4b was obtained in the same manner as in Example 5 except that the regenerated denitration catalyst 2b was used in place of the regenerated denitration catalyst 1a. The results are shown in Table 2.

As shown in Table 2, the denitration catalysts regenerated according to the method of the present invention, have low content of arsenic and high recovery percentage of the denitration efficiency.

TABLE 2

|  | As Content in Catalyst (wt %-$As_2O_3$) | Mn content in Catalyst (wt %-MnO) | Denitration efficiency (%) |
| --- | --- | --- | --- |
| Catalyst to be regenerated | 2.8 | Not Detected | 38 |
| Ex. 1 | 0.8 | <0.1 | 55 |
| Ex. 2 | 1.2 | <0.1 | 53 |
| Ex. 3 | 0.9 | 0.2 | 54 |
| Ex. 4 | 0.7 | 0.2 | 56 |
| Comp. Ex. 1 | 2.8 | Not Detected | 37 |
| Comp. Ex. 2 | 2.0 | Not Detected | 45 |
| Ex. 5 | 0.7 | <0.1 | 65 |
| Ex. 6 | 1.0 | <0.1 | 62 |
| Ex. 7 | 0.0 | 0.2 | 67 |
| Ex. 8 | 0.7 | 0.2 | 65 |
| Comp. Ex. 3 | 2.8 | Not Detected | 45 |
| Comp. Ex. 4 | 2.7 | Not Detected | 52 |

The invention claimed is:

1. A method for regenerating used denitration catalyst, comprising:

bringing a used denitration catalyst, to which arsenic and phosphorus coming from an exhaust gas adhere, comprising titanium oxide as an essential ingredient into contact with a suspension comprising a suspensoid composed of particles comprising manganese oxide, wherein the particles comprising manganese oxide are manganese oxide-supported on aluminum oxide particles or manganese oxide-supported on titanium oxide particles, subjecting the resulting product to a removal of the suspensoid and a liquid draining, and subjecting the suspensoid-removed and liquid-drained product to a drying process, whereby the arsenic and phosphorus are removed from the used denitration catalyst.

2. The method for regenerating used denitration catalyst according to claim 1, wherein the manganese oxide is MnO or $Mn_3O_4$.

3. The method for regenerating used denitration catalyst according to claim 1, further comprising:

impregnating a solution comprising a compound containing at least one element selected from the group consisting of vanadium, molybdenum and tungsten into the denitration catalyst after the drying process, and subjecting the impregnated product to a drying treatment.

4. The method for regenerating used denitration catalyst according to claim 3, wherein the manganese oxide is MnO or $Mn_3O_4$.

5. The method according to claim 1, wherein the used denitration catalyst is a honeycomb shaped catalyst comprising a catalytic active substance, or a catalyst comprising a plate-shaped substrate and a catalytic active substance supported on the plate-shaped substrate, wherein the titanium oxide is employed as the catalytic active substance.

6. The method according to claim 3, wherein the used denitration catalyst is a honeycomb shaped catalyst comprising a catalytic active substance, or a catalyst comprising a plate-shaped substrate and a catalytic active substance supported on the plate-shaped substrate, wherein the titanium oxide is employed as the catalytic active substance.

* * * * *